(12) United States Patent
Singireddy et al.

(10) Patent No.: US 11,805,401 B2
(45) Date of Patent: Oct. 31, 2023

(54) DYNAMIC CONTROLLER SELECTION FOR A LOCAL AREA NETWORK

(71) Applicant: Apple Inc., Cupertino, CA (US)

(72) Inventors: Avinash Reddy Singireddy, Sunnyvale, CA (US); Anjali S. Sandesara, Sunnyvale, CA (US); Sergey Chemishkian, San Jose, CA (US); Yilok L. Wong, Mountain View, CA (US); Bob Bradley, San Jose, CA (US); Michael Giles, San Jose, CA (US)

(73) Assignee: Apple Inc., Cupertino, CA (US)

(*) Notice: Subject to any disclaimer, the term of this patent is extended or adjusted under 35 U.S.C. 154(b) by 216 days.

(21) Appl. No.: 17/483,742

(22) Filed: Sep. 23, 2021

(65) Prior Publication Data

US 2022/0095091 A1 Mar. 24, 2022

Related U.S. Application Data

(60) Provisional application No. 63/082,435, filed on Sep. 23, 2020.

(51) Int. Cl.
*H04W 4/00* (2018.01)
*H04W 8/00* (2009.01)

(52) U.S. Cl.
CPC ................. *H04W 8/005* (2013.01)

(58) Field of Classification Search
CPC ... H04W 8/00; H04W 8/005; H04W 52/0216; H04M 1/72412
USPC .................................. 370/328, 329
See application file for complete search history.

(56) References Cited

U.S. PATENT DOCUMENTS

| | | | | |
|---|---|---|---|---|
| 9,143,412 | B1* | 9/2015 | Nay | H04L 67/12 |
| 9,240,977 | B2* | 1/2016 | Shekhar Rao Tumula | |
| | | | | H04W 12/37 |
| 9,441,976 | B2* | 9/2016 | Venkatraman | H04W 4/024 |
| 10,440,499 | B2* | 10/2019 | Farrell | H04W 4/08 |
| 11,356,352 | B2* | 6/2022 | Rauenbuehler | H04L 43/0811 |
| 11,677,688 | B2* | 6/2023 | Didear | G06T 15/005 |
| | | | | 703/23 |
| 2004/0023640 | A1* | 2/2004 | Ballai | H04L 63/10 |
| | | | | 455/410 |

(Continued)

*Primary Examiner* — Marceau Milord
(74) *Attorney, Agent, or Firm* — BAKERHOSTETLER

(57) ABSTRACT

A device implementing dynamic controller selection may include a processor configured to generate a connectivity graph based on a scan for accessory devices, the connectivity graph including a connectivity metric value for a discovered accessory device. The processor may be configured to broadcast the connectivity graph and receive another connectivity graph broadcasted by another electronic device that includes another connectivity metric value for the accessory device. The processor may be configured to receive a request to provide an instruction to the accessory device and determine which of the electronic devices will provide the instruction based on the connectivity metric values. The processor may be further configured to, when the electronic device is determined, provide the instruction for transmission to the accessory device, and when the other electronic device is determined, provide, for transmission to the other electronic device, the instruction to be provided to the accessory device.

20 Claims, 6 Drawing Sheets

(56) References Cited

U.S. PATENT DOCUMENTS

| | | | | |
|---|---|---|---|---|
| 2009/0180451 | A1* | 7/2009 | Alpert | H04W 72/1215 |
| | | | | 370/338 |
| 2010/0317374 | A1* | 12/2010 | Alpert | H04W 68/02 |
| | | | | 455/458 |
| 2011/0021142 | A1* | 1/2011 | Desai | H04W 4/80 |
| | | | | 455/41.2 |
| 2014/0221013 | A1* | 8/2014 | Vaccari | H04W 64/00 |
| | | | | 455/456.3 |
| 2014/0221022 | A1* | 8/2014 | Vaccari | H04W 4/022 |
| | | | | 455/456.6 |
| 2014/0222810 | A1* | 8/2014 | Vaccari | G06F 16/9024 |
| | | | | 707/736 |
| 2018/0129493 | A1* | 5/2018 | Deixler | H05B 47/175 |
| 2018/0247253 | A1* | 8/2018 | Duquene | H04L 9/3247 |
| 2019/0222630 | A1* | 7/2019 | Schilit | G06F 3/0484 |
| 2019/0251598 | A1* | 8/2019 | Showers | G06Q 30/02 |
| 2020/0372806 | A1* | 11/2020 | Wang | G08G 5/0069 |
| 2020/0382298 | A1* | 12/2020 | Daley | H04L 9/30 |
| 2020/0410314 | A1* | 12/2020 | Stahlhut | G07F 7/0833 |
| 2021/0083992 | A1* | 3/2021 | Didear | H04L 67/75 |
| 2021/0385144 | A1* | 12/2021 | Rauenbuehler | H04L 43/10 |

* cited by examiner

DYNAMIC CONTROLLER SELECTION FOR A LOCAL AREA NETWORK

CROSS REFERENCE TO RELATED APPLICATIONS

This application claims the benefit of U.S. Provisional Patent Application No. 63/082,435, entitled "Dynamic Controller Selection for a Local Area Network," filed on Sep. 23, 2020, the disclosure of which is hereby incorporated herein in its entirety.

TECHNICAL FIELD

The present description relates generally to controller selection, including dynamic controller selection for a local area network.

BACKGROUND

Multiple different devices in a home may be communicably coupled together to form a home network environment. For example, a home network environment may include a smart thermostat, smart switches, smart light bulbs, and the like.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
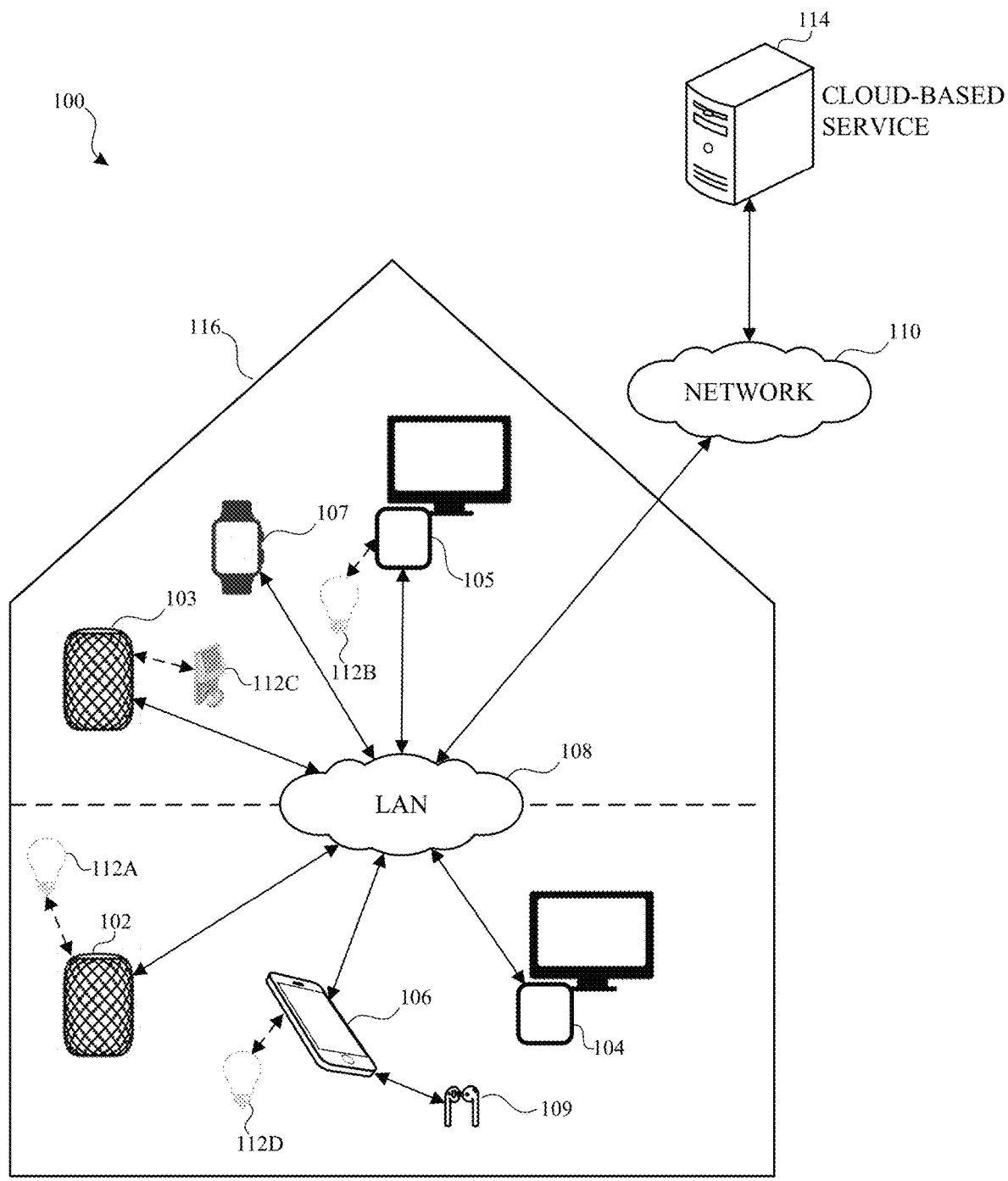
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A home network environment may include one or more resident devices and one or more accessory devices. A resident device may be an electronic device that is configured to establish a connection with a local area network within the home, while an accessory device may be an electronic device that is configured to establish a peer-to-peer connection with, and receive instructions from, a resident device in the home (e.g., rather than establishing a connection with the local area network). Example resident devices may include set-top boxes, media players, a smart speakers, tablet devices, mobile devices, and the like, while example accessory devices may include smart light bulbs, smart thermostats, smart locks, and the like. In one or more implementations, an accessory device may instead utilize low power short range communication protocols, such as Bluetooth low energy (BLE), BLE Long Range, Zigbee, Thread, and the like, to establish the peer-to-peer connections with one or more of the resident devices.

For example, a user may request via a tablet device to turn on a light bulb in the home. The tablet device may attempt to control the light bulb by establishing a peer-to-peer connection with the light bulb and transmitting an instruction to the light bulb to turn itself on. However, depending on the layout of the home, the light bulb may be outside of the range of the short range communication protocol with respect to the tablet device (even though the light bulb may be within the range of the short range communication protocol with respect to another resident device in the home network environment). In the instance that the light bulb is outside of the range of the short range communication protocol, the peer-to-peer transmission of the instruction by the tablet device to the light bulb may fail, or the reception of the instruction may be delayed. The failure or latency of transmission may result in a poor user experience and may necessitate additional processing and/or communication resources for retransmission.

The subject system for dynamic controller selection in a local area network may dynamically determine the appropriate resident device for controlling an accessory device (e.g., rather than defaulting to the resident device from which the request was received). For example, when a resident device in a home receives a request to provide an instruction to an accessory device in the home, the resident device may broadcast a request for connectivity metric values of other resident devices in the home with respect to the accessory device. A connectivity metric value may be indicative of a suitability of a resident electronic device for providing the instruction to the accessory device. The request may include the connectivity metric value for the resident device that received the request, as well as an indication of the instruction to be provided to the accessory device. In response, the resident device may receive one or more connectivity metric values broadcasted by other resident devices in the home and may determine, based on its connectivity metric value and the received connectivity metric values, whether it should provide the instruction to the accessory device or whether another resident device in the home will provide the instruction to the accessory device.

Similarly, each of the other resident devices in the home may receive the broadcasted connectivity metric values from the other resident devices and each of the other resident devices may individually determine whether it should provide the instruction to the accessory device. For example, the resident device with the highest connectivity metric value may provide the instruction to the accessory device, while the other resident devices may determine that they should not provide the instruction to the accessory device. In this manner, the best suited resident device can be dynamically selected to provide the instruction to the accessory device rather than defaulting to the resident device that received the request, thereby reducing the latency of providing the instruction to the accessory device, reducing the need for retransmissions and the additional processing and communication resources associated therewith, and balancing the load of transmitting the instructions across the resident devices in the home network environment.

In one or more implementations, the resident devices in the home network environment may periodically scan for accessory devices and may maintain a connectivity graph that indicates their connectivity metric values (and/or positioning information) with respect to the accessory devices. The resident devices may broadcast and/or otherwise communicate their connectivity graphs to one another such that when a request to control an accessory device is received by a resident device, the resident device can lookup the appropriate resident device for controlling the accessory device from the connectivity graph and can immediately forward the instruction to the appropriate resident device for providing the instruction to the accessory device. In one or more implementations, one or more of the connectivity graphs may include relative and/or absolute positioning information, such as angle/orientation and/or distance, with respect to one or more of the accessory devices.

FIG. 1 illustrates an example network environment 100 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes resident electronic devices 102, 103, 104, 105, 106 and 107 (hereinafter "the resident electronic devices 102-107"), a local area network ("LAN") 108, a companion electronic device 109, a network 110, the accessory electronic devices 112A-D, and one or more cloud-based service(s) 114 (hereinafter "the server 114"). In one or more implementations, the resident electronic devices 102-107 and the accessory electronic devices 112A-D may be part of a home network environment 116, and the LAN 108 may communicatively (directly or indirectly) couple any two or more of the resident electronic devices 102-107 within the home network environment 116. Moreover, the network 110 may communicatively (directly or indirectly) couple any two or more of the resident electronic devices 102-107 with the server 114, for example, in conjunction with the LAN 108. One or more of the accessory electronic devices 112A-D may be configured to communicate via a peer-to-peer connection with one or more of the resident electronic devices 102-107. In one or more implementations, one or more of the accessory electronic devices 112A-D may not be configured to communicate via the LAN 108.

In one or more implementations, the LAN 108 may include one or more different network devices/network medium and/or may utilize one or more different wireless and/or wired network technologies, such as Ethernet, optical, Wi-Fi, Bluetooth, Zigbee, Powerline over Ethernet, coaxial, Ethernet, Z-Wave, cellular, or generally any wireless and/or wired network technology that may communicatively couple two or more devices. In one or more implementations, the network 110 may be an interconnected network of devices that may include, and/or may be communicatively coupled to, the Internet. For explanatory purposes, the network environment 100 is illustrated in FIG. 1 as including the resident electronic devices 102-107, the accessory electronic devices 112A-D, and the server 114; however, the network environment 100 may include any number of electronic devices and any number of servers.

One or more of the resident electronic devices 102-107 may be, for example, a portable computing device such as a laptop computer, a smartphone, a smart speaker, a peripheral device (e.g., a digital camera, headphones), a digital media player, a tablet device, a wearable device such as a smartwatch or a band, a set-top box device, or any other appropriate device that includes one or more wired or wireless interfaces for communicating via the LAN 108 and/or the network 110, such as WLAN radios, cellular radios, and the like. One or more of the accessory electronic devices 112A-D may be, for example, a connected home device, such as a wireless camera, a wireless access device (e.g., a smart lock), a smart thermostat, smart light bulbs, home security devices (e.g., motion sensors, door/window sensors, etc.), smart outlets, smart switches, and the like, or any other appropriate device that includes and/or is communicatively coupled to, for example, one or more wired or wireless interfaces, for establish a peer-to-peer connection with one or more of the resident electronic devices 102-107, such as Powerline Ethernet interfaces, WLAN radios, cellular radios, Bluetooth radios, Zigbee radios, near field communication (NFC) radios, and/or other wireless radios. The companion electronic device 109 may be, for example, an audio output device that is associated with the resident electronic device 106, and may be configured to be communicatively coupled to one or more of the resident electronic devices 102-107.

By way of example, in FIG. 1 each of the resident electronic devices 102-103 is depicted as a smart speaker, the resident electronic device 106 is depicted as a smartphone, the resident electronic device 107 is depicted as a smartwatch, each of the resident electronic devices 104-105 is depicted as a digital media player (e.g., configured to receive digital data such as music and/or video and stream it to a display device such as a television or other video display), each of the accessory electronic devices 112A-B, and D is depicted as a smart light bulb, and the accessory electronic device 112C is depicted as a smart lock. In one or more implementations, one or more of the resident electronic devices 104-105 may be integrated into its corresponding display device. One or more of the resident electronic devices 102-107, the companion electronic device 109, and/or the accessory electronic devices 112A-D may be, and/or may include all or part of, the electronic device discussed below with respect to FIG. 2, and/or the electronic system discussed below with respect to FIG. 6.

In one or more implementations, one or more of the resident electronic devices 102-107, the companion electronic device 109, and/or the accessory electronic devices 112A-D may be registered with a same user account, such as at the server 114. For example, a user may register and/or configure the home network environment 116 via the server 114, where the home network environment 116 includes the resident electronic devices 102-105 as well as the accessory electronic devices 112A-D. The electronic devices 106-107 may also be associated with the user's account and may effectively become resident electronic devices in the home network environment 116 when the electronic devices 106-107 are connected to the LAN (such as a wireless network) to which the other resident electronic devices 102-105 are connected.

Since, in one or more implementations, the accessory electronic devices 112A-D cannot connect to the LAN 108, the user may register and/or associate one or more of the accessory electronic devices 112A-D to their user account with the server 114 via one of the resident electronic devices 102-107. For example, the resident electronic device 105 may establish a peer-to-peer connection with the accessory electronic device 112B, such as via BLE, and may then register and/or associate the accessory electronic device 112B with a user account at the server 114.

In one or more implementations, one or more of the resident electronic devices 106 and/or 107 may be associated with a different user account than the other resident electronic devices 102-105 (such as the user account of a neighbor, a user account of family member, a user account of a transient visitor, and the like), and may be granted access, such as via the user account associated with one or more of the other resident electronic devices 102-105, to control and/or relay instructions to one or more of the accessory electronic devices 112A-D. Thus, in one or more implementations, a neighbor's electronic device that is not physically located in the same location as the home network environment 116 may be used as a resident electronic device for the home network environment by relaying commands from a remote electronic device to one or more of the accessory electronic devices 112A-D within the home network environment 116.

In one or more implementations, one or more of the electronic devices 106 and/or 107 may opt-in to operate as resident electronic devices in one or more network environments that include one or more resident electronic devices 102-105 that are associated with a trusted user account, such as a user account that is in the same sharing group (e.g., a same family group) as the user account associated with the one or more of the electronic devices 106 and/or 107, a user account associated with a contact of the user account associated with the one or more of the electronic devices 106 and/or 107, and/or generally any trusted user account.

In one or more implementations, access control lists, access control rules, and/or profiles may be used to automatically manage granular access to resources, such as access to one or more of the electronic devices 102-107 and/or 112A-D, and may be triggered by one or more of location, time and/or other factors.

In the subject system, when one of the resident electronic devices 102-107, such as the resident electronic device 106, receives a request to control one or more of the accessory electronic devices 112A-D, such as the accessory electronic device 112A, the resident electronic device 106 dynamically determines which of the resident electronic devices 102-107 is best suited for controlling (e.g., providing an instruction to) the accessory electronic device 112A, such as based on connectivity metric values determined for the resident electronic devices 102-107 with respect to the accessory electronic device 112A, and the resident electronic device 106 provides an instruction for controlling the accessory electronic device 112A to the determined resident electronic device. A connectivity metric value of a resident device may be based on, for example, a link metric with respect to the accessory electronic device (e.g., a received signal strength indicator (RSSI)) and/or one or more operational characteristics of the resident electronic device, such as available processing resources, available communication resources, and the like. Example connectivity metric values are discussed further below with respect to FIGS. 3-4.

For example, the resident electronic device 107 may receive a user request to control an accessory electronic device 112A via a user interface displayed by the resident electronic device 107. In another example, one or more of the resident electronic devices 102-105, such as the resident electronic device 104, may be configured as the hub resident electronic device for the home network environment 116. The hub resident electronic device may be configured to receive requests to control one or more of the accessory electronic devices 112A-D from outside of the home network environment 116, such as via the network 110. For example, the user of the resident electronic device 106 may request to control an accessory electronic device 112A while outside of the home network environment 116 via the hub resident electronic device 104.

An example process for dynamic controller selection based on responsively obtained connectivity metric values is discussed further below with respect to FIG. 3, and an example process with respect to a priori obtained connectivity metric values is discussed further below with respect to FIG. 4. In one or more implementations, utilizing responsively obtained connectivity metric values may provide the most up-to-date/accurate connectivity metric values while introducing some latency for obtaining the values, whereas utilizing a priori obtained connectivity metric values may not be the most up-to-date/accurate (which may or may not be relevant depending upon the home network configuration/attributes), but may avoid the latency associated with responsively obtaining the connectivity metric values.

In one or more implementations, the subject system may adaptively switch between responsively obtained connectivity metric values and a priori obtained connectivity metric values. For example, when the connectivity metric values of the resident electronic devices 102-107, e.g. with respect to a given accessory electronic device 112A, are relatively static over a given period of time, the resident electronic devices 102-107 may rely on the a prior obtained connectivity metric values, whereas when the connectivity metric values are fluctuating over a given period of time with respect to the given accessory electronic device 112A, the resident electronic devices 102-107 may switch to the responsively obtained connectivity metric values.

In one or more implementations, one or more of the resident electronic devices 102-107 may opt-in to operate as a resident electronic device in any network environment, e.g., irrespective of the user account associated with the other electronic devices in the network environment. For example, if the electronic device 107 receives a request to transmit a command to an accessory electronic device 112A, the electronic device 107 transmit a request for connectivity metric values over the LAN 108 (e.g., via Wi-Fi) to the other resident electronic devices 102-106 that have opted-in to operate as resident electronic devices in any network environment and/or to the other resident electronic devices 102-106 that are associated with a trusted user account. The electronic device 107 may receive responses from the other electronic devices 102-106 that include the requested connectivity metric values and may select one of the electronic devices 102-106 to transmit the command to the accessory electronic device 112A based on the received connectivity metric values, such as based on which of the other electronic devices 102-106 has a highest RSSI value for communicating with the accessory electronic device 112A. The electronic device 107 may then relay the command to the selected one of the electronic devices 102-106.

In one or more implementations, one or more of the resident electronic devices 102-107 may measure, maintain, and/or share relative and/or absolute positioning information for one or more of the other resident electronic devices 102-107 and/or one or more of the accessory electronic devices 112A-D. Thus, one or more of the resident electronic devices 102-107 may maintain a positioning map corresponding to one or more of the other resident electronic devices 102-107 and/or one or more of the accessory electronic devices 112A-D. The positioning information may allow one or more of the accessory electronic devices 112A-D to be identified based on its proximity and/or location relative to one or more of the resident electronic devices 102-107 and/or one or more of the other accessory electronic devices 112A-D. For example, the accessory electronic device 112B may be identified as the light bulb near the digital media player 105. An example network environment in which resident electronic devices utilize positioning information is discussed further below with respect to FIG. 5.

For explanatory purposes, FIG. 1 is described herein with respect to a home network environment 116. However, it will be understood that the home network environment may be implemented in a business network environment, or generally in any network environment that includes one or more resident electronic devices 102-107 and one or more accessory electronic devices 112A-D.

Figure 2:
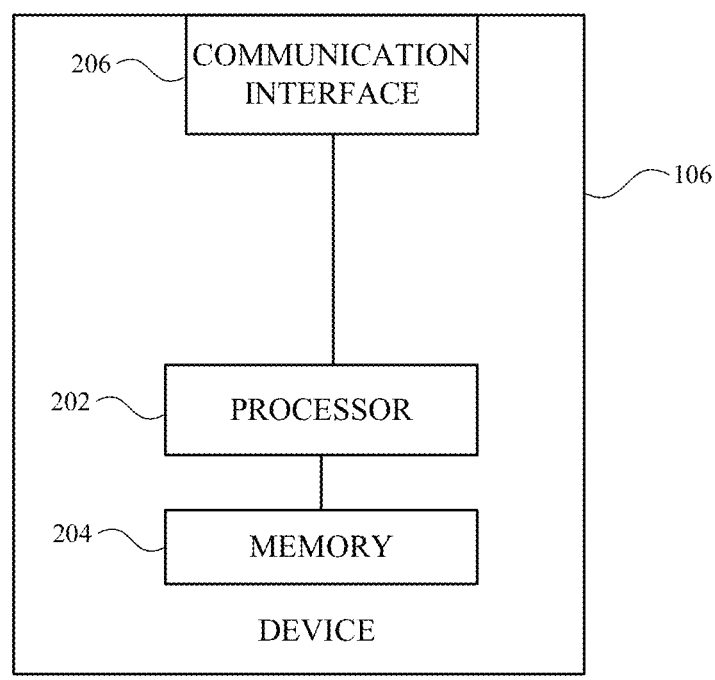
FIG. 2 illustrates an example resident electronic device that may be used in a system for dynamic controller selection for a local area network in accordance with one or more implementations.

FIG. 2 illustrates an example resident electronic device 106 that may be used in a system for dynamic controller selection for a local area network in accordance with one or more implementations. For explanatory purposes, the resident electronic device 106 is illustrated in FIG. 2. However, one or more of the components of the resident electronic device 106 may also be implemented by one or more of the other resident electronic devices 102-105, 107, one or more of the accessory electronic devices 112A-D, and/or the server 114 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The resident electronic device 106 may include a processor 202, a memory 204, and a communication interface 206. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The communication interface 206 may include suitable logic, circuitry, and/or code that enables wired or wireless communication, such as between any of the resident electronic devices 102-107, the companion electronic device 109, the accessory electronic devices 112A-D, and/or the server 114 over the network 110 (e.g., in conjunction with the LAN 108), and/or via peer-to-peer communications. The communication interface 206 may include, for example, one or more of a Bluetooth communication interface, a cellular interface, an NFC interface, a Zigbee communication interface, a WLAN communication interface, a USB communication interface, or generally any communication interface. In one or more implementations, the communication interface 206 may include a Bluetooth-WLAN combination interface, such as when implemented by one or more of the resident electronic devices 102-107, while the communication interface 206 may include only a Bluetooth interface when implemented by one or more of the accessory electronic devices 112A-D.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
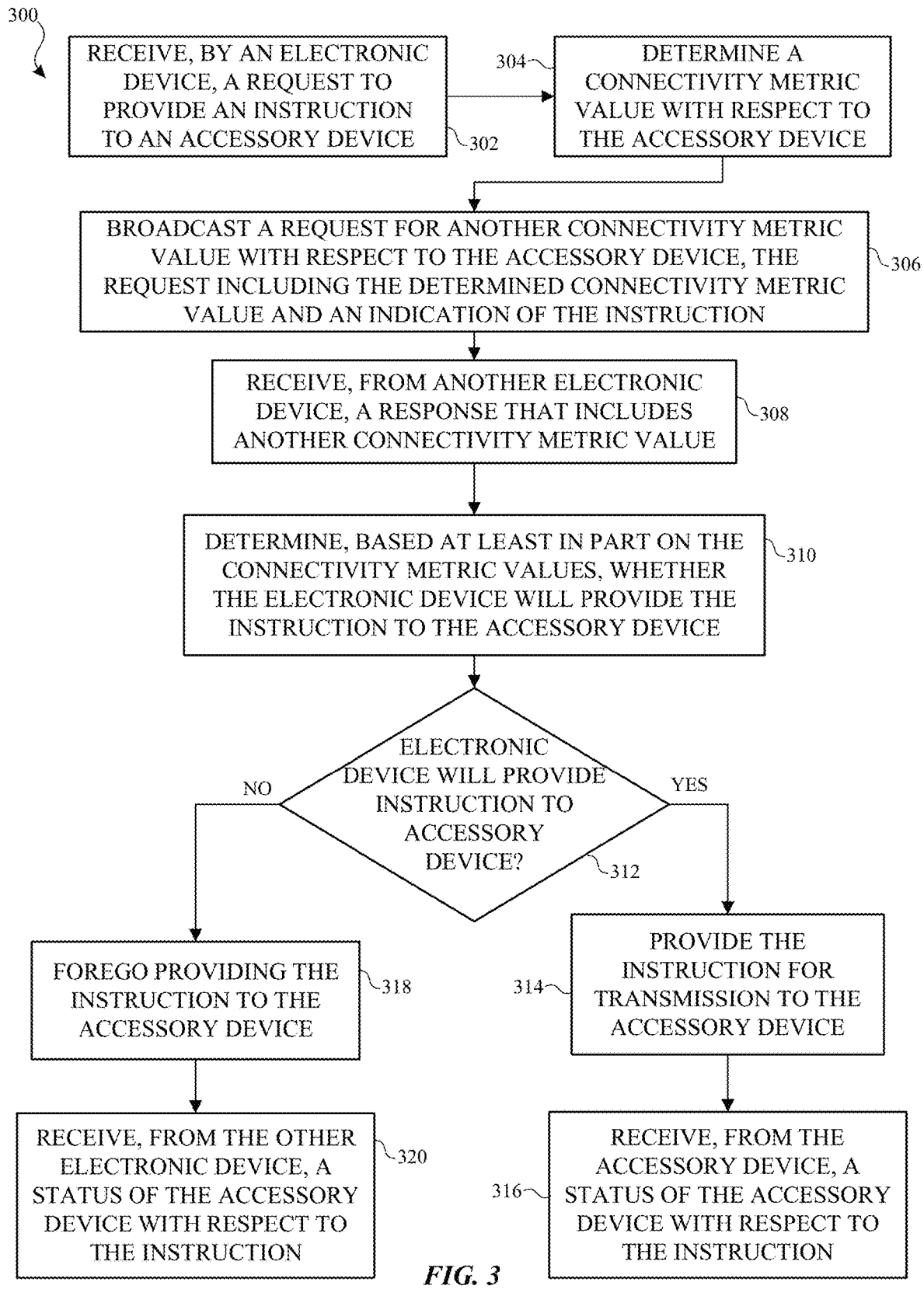
FIG. 3 illustrates an example process for dynamic controller selection for a local area network based on responsively obtained connectivity metric values in accordance with one or more implementations.

FIG. 3 illustrates an example process 300 for dynamic controller selection for a local area network based on responsively obtained connectivity metric values in accordance with one or more implementations. For explanatory purposes, the process 300 is primarily described herein with reference to the resident electronic device 106 and the accessory electronic device 112A of FIG. 1. However, the process 300 is not limited to the resident electronic device 106 and the accessory electronic device 112A, and one or more blocks (or operations) of the process 300 may be performed by one or more other components and/or other suitable devices (e.g., any of the resident electronic devices 102-107 and/or the accessory electronic devices 112A-D). Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The process 300 begins when one of the resident electronic devices 102-107, such as the resident electronic device 106, receives a request to provide an instruction to an accessory electronic device, such as the accessory electronic device 112A (302). For example, a user interacting with a user interface displayed by the resident electronic device 106 may request to provide an instruction to the accessory electronic device 112A, such as to turn on and/or activate at least a portion of the accessory electronic device 112A. In one or more implementations, the user may provide a voice command to the resident electronic device 106 requesting that the instruction be provided to the accessory electronic device 112A.

In response to the request, the resident electronic device 106 determines a connectivity metric value with respect to the accessory electronic device 112A (304). For example, the connectivity metric value may be determined based at least in part on a link metric (e.g., RSSI) with respect to a link between the resident electronic device 106 and the accessory electronic device 112A, and/or one or more operational characteristics of the resident electronic device 106, such as available processing resources and/or available communication resources of the resident electronic device 106. For example, if the resident electronic device 106 includes a Bluetooth/Wi-Fi combination communication interface 206, and the resident electronic device 106 is utilizing the communication interface 206 for Wi-Fi communications, the resident electronic device 106 may have limited communication resources available for establishing a peer-to-peer connection with the accessory electronic device 112A.

In one or more implementations, the connectivity metric may be calculated based on RSSI, CPUUsage (available processing resources) and BluetoothWiFiUsage (available communication resources using equation (1) shown below, where $\alpha$, $\beta$, and $\gamma$ are configurable constants.

$$\alpha*RSSI+\beta*1/(CPUUsage)+\gamma*1/(BTWifiUsage) \qquad (eq. 1)$$

After determining a connectivity metric value with respect to the accessory electronic device 112A, the resident electronic device 106 broadcasts a request (e.g., via an advertisement packet and/or another pre-association communication) for another connectivity metric value from another resident device with respect to the accessory electronic device 112A, where the request includes the determined connectivity metric value of the resident electronic device 106 as well as an indication of the accessory electronic device 112A and the instruction to be provided to the accessory electronic device 112A (306). In one or more implementations, the resident electronic device 106 may broadcast the request and then may separately broadcast one or more of the connectivity metric value or the indication of the accessory electronic device 112A and/or the instruction.

In response to the broadcasted request, the resident electronic device 106 receives, from another resident electronic device, such as the resident electronic device 102, a response that includes another connectivity metric value (308). For example, the resident electronic device 102 may have received the request broadcasted by the resident electronic device 106, determined a connectivity metric value with respect to the accessory electronic device 112A, and broadcasted back the response to the resident electronic device 106 (and any other resident electronic devices that received the broadcasted request). In one or more implementations, the resident electronic device 106 may receive responses from one or more other resident electronic devices 103-105, 107 in the home network environment 116. In one or more implementations, in order to reduce latency, the resident electronic device 106 may implement a timeout period for receiving responses to the broadcasted request.

The resident electronic device 106 determines, based at least in part on the received connectivity metric values, whether the resident electronic device 106 will provide the instruction to the accessory electronic device 112A, or whether another of the resident electronic device will provide the instruction to the accessory electronic device 112A (310). For example, the resident electronic device 106 may determine that the resident electronic device 106 with the highest connectivity metric value with respect to the accessory electronic device 112A will provide the instruction to the accessory electronic device 112A.

In one or more implementations, one or more of the resident electronic devices 102-107 may broadcast a hash value in addition to the connectivity metric value. The hash value may be generated based on an a priori determined hash algorithm, such as by hashing a communication address (e.g., a MAC address) of the resident electronic devices 102-107. In this instance, if the connectivity metric values of two or more of the resident electronic devices 102-107 is the same, the resident electronic devices 102-107 may use the hash values to determine which of the two or more of the resident electronic devices 102-107 will provide the instruction to the accessory electronic device 112A (such as based on the highest or lowest hash value).

If the resident electronic device 106 determines that it will provide the instruction to the accessory electronic device 112A (312), the resident electronic device 106 provides the instruction for transmission to the accessory electronic device 112A (314). For example, the resident electronic device 106 may establish a peer-to-peer connection with the accessory electronic device 112A (e.g., via BLE, Wi-Fi, or any peer-to-peer communication mechanism), and may transmit the instruction to the accessory electronic device 112A via the peer-to-peer connection. The resident electronic device 106 may then receive, from the accessory electronic device 112A, a status of the accessory electronic device 112A with respect to the provided instruction (316). For example, the accessory electronic device 112A may communicate a response indicating that the instruction has been completed (316) and, for example, at least a portion and/or component of the accessory electronic device 112A has been activated (e.g., a light portion of a light bulb has been powered on). The resident electronic device 106 may then update the user interface to indicate the status to the user.

If the resident electronic device 106 determines that it will not provide the instruction to the accessory electronic device 112A (312), the resident electronic device 106 forgoes providing the instruction to the accessory electronic device 112A (318). The resident electronic device 106 may then receive, from another resident electronic device 102 that determined that it would provide the instruction to the accessory electronic device 112A, the status of the accessory electronic device 112A with respect to the instruction (320), such as whether the instruction was successfully performed or not. The resident electronic device 106 may then update the user interface to indicate the status to the user.

For example, as illustrated in FIG. 1, the accessory electronic device 112A is closer to the resident electronic device 102 than the resident electronic device 106, which may be reflective in higher RSSI/connectivity metric values. Thus, the resident electronic device 102 may determine that it will provide the instruction to the accessory electronic device 112A, rather than the resident electronic device 106, and likewise the resident electronic device 106 may determine that it will not provide the instruction to the accessory electronic device 112A.

In one or more implementations, if the resident electronic device 106 did not provide the instruction in conjunction with broadcasting the request for the other connectivity metric values, the resident electronic device 106 may provide the instruction to the other resident electronic device 102 that will provide the instruction to the accessory electronic device 112A responsive to making a determination of the same.

Figure 4:
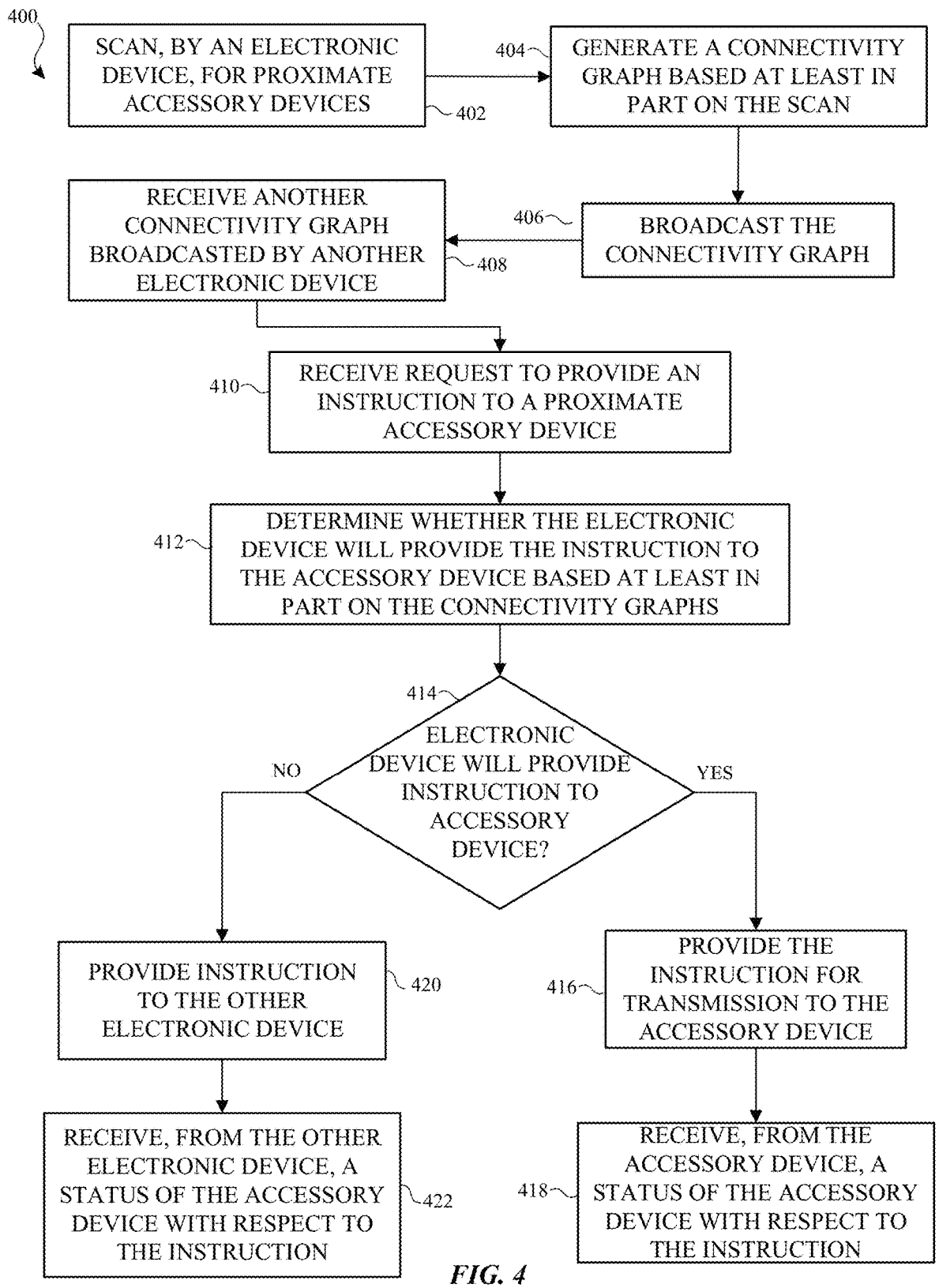
FIG. 4 illustrates an example process for another dynamic controller selection for a local area network based on a priori obtained connectivity metric values in accordance with one or more implementations.

FIG. 4 illustrates an example process 400 for another dynamic controller selection for a local area network based on a priori obtained connectivity metric values in accordance with one or more implementations. For explanatory purposes, the process 400 is primarily described herein with reference to the resident electronic device 106 and the accessory electronic device 112A of FIG. 1. However, the process 400 is not limited to the resident electronic device 106 and the accessory electronic device 112A, and one or more blocks (or operations) of the process 300 may be performed by one or more other components and/or other suitable devices (e.g., any of the resident electronic devices 102-107 and/or the accessory electronic devices 112A-D). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The process 400 begins when one of the resident electronic devices 102-107, such as the resident electronic device 106, scans for proximate accessory electronic devices 112A-D (402). For example, the resident electronic device 106 may transmit an advertisement packet or other pre-association packet to illicit a response from any accessory electronic devices 112A-D that are within communication range. In one or more implementations, the scan may detect additional proximate electronic devices (e.g., separate from the accessory electronic devices 112A-D), such as the companion electronic device 109. The resident electronic device 106 may then generate a connectivity graph based at least in part on the scan (404). The connectivity graph may include, for example, RSSI values with respect to each of the proximate electronic devices detected via the scan, and/or the connectivity graph may include connectivity metric values (calculated as described above) and/or positioning information (as described further below) with respect to the detected proximate electronic devices.

The resident electronic device 106 may then broadcast its connectivity graph for reception by any other resident electronic devices 102-105, 107 in the home network environment 116 (406) and may receive another connectivity graph broadcasted by another resident electronic device 102 in the home network environment 116 (408). In one or more implementations, the resident electronic device 106 may receive connectivity graphs from multiple resident electronic devices in the home network environment 116.

The resident electronic device 106 may subsequently receive a request to provide an instruction to a proximate accessory electronic device 112A (410), and may determine whether the resident electronic device 106 will provide the instruction to the accessory electronic device 112A based at least in part on the connectivity graphs (412). For example, the resident electronic device 106 may merge its connectivity graph with the received connectivity graphs of the other resident electronic devices 102-105, 107 in the home network environment 116 to generate a connectivity graph that is reflective of an aggregate home network environment radio. The resident electronic device 106 may then use the connectivity graph to determine the best path for any given instruction/transmission, such as based on RSSI and/or connectivity metric values. For example, if a user is streaming audio from a resident electronic device 106 to a companion electronic device 109, the companion electronic device 109 can be handed off to another resident electronic device, such as the resident electronic device 102, based on the RSSI values and/or connectivity graphs (and/or positioning information described below) with respect to the companion electronic device 109.

If the resident electronic device 106 determines that it will provide the instruction to the accessory electronic device 112A (414), the resident electronic device 106 provides the instruction for transmission to the accessory electronic device 112A (416), and receives, from the accessory electronic device 112A, a status of the accessory electronic device 112A with respect to the provided instruction (418). If the resident electronic device 106 determines that it will not provide the instruction to the accessory electronic device 112A (412), the resident electronic device 106 provides the instruction to the other resident electronic device 102 that will provide the instruction to the accessory electronic device 112A (420), and receives, from the other resident electronic device 102, the status of the accessory electronic device 112A with respect to the instruction (422), such as whether the instruction was successfully performed or not.

In one or more implementations, the resident electronic device 106 may perform the scanning, generating/updating of the connectivity graph, and the broadcasting of the connectivity graph periodically. Similarly, the resident electronic device 106 may receive broadcasted connectivity graphs from the other resident electronic devices 102-105, 107 in the home network environment 116 periodically. In one or more implementations, the resident electronic device 106 can proactively request a connectivity graph from one or more of the other resident electronic devices 102-105, 107. In one or more implementations, the resident electronic device 106 can re-broadcast one or more connectivity graphs received from one or more other resident electronic devices 102-105, 107.

In one or more implementations, if a user is looking for a particular device, such as the companion electronic device 109, the resident electronic device 106 can query its connectivity graph to identify which other resident electronic device the companion electronic device 109 is likely closest to (e.g., based on RSSI values and/or the positioning information described below). The resident electronic device 106 can then inform the user that the companion electronic device 109 is likely near, for example, the resident electronic device 102.

Figure 5:
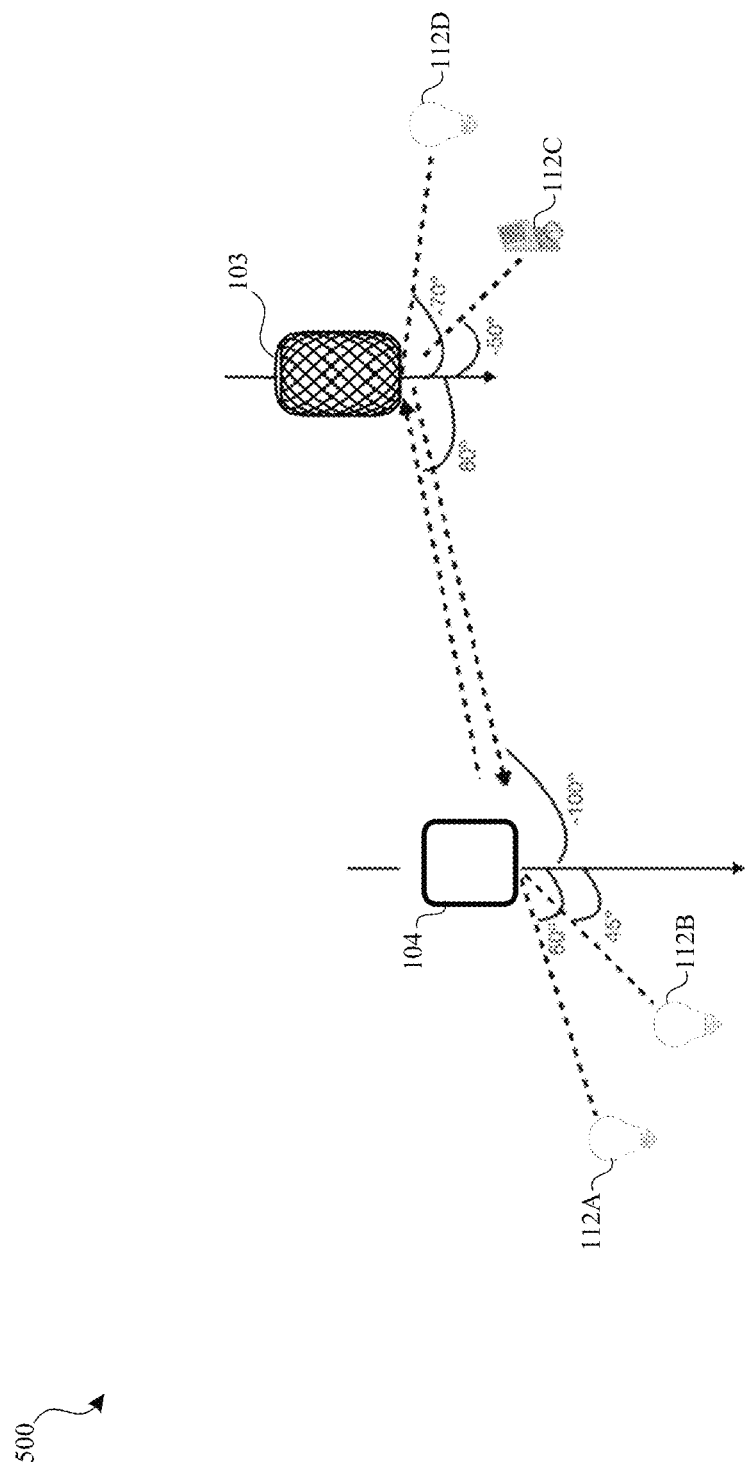
FIG. 5 illustrates an example network environment in which resident electronic devices utilize positioning information in accordance with one or more implementations.

FIG. 5 illustrates an example network environment 500 in which resident electronic devices utilize positioning information accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 500 includes resident electronic devices 103-104 and the accessory electronic devices 112A-D. One or more of the resident electronic devices 103-104 and/or one or more of the accessory electronic devices 112A-D may implement one or more positioning measurement technologies/operations, such as angle of arrival (AoA), angle of departure (AoD), high accuracy distance measurement (HADM), ultrawide band (UWB), distance/depth detection using computer vision, or generally any positioning operations and/or protocols. The positioning operations may be performed over, for example, Bluetooth, Wi-Fi, or generally any wireless technology.

The resident electronic devices 103-104 may utilize one or more positioning technologies to generate a map of the other resident electronic devices 103-104 and the accessory electronic devices 112A-D that are within signal range. As shown in FIG. 5, the resident electronic device 104 may determine positions of, and generate a map for, the accessory electronic devices 112A-B, and the resident electronic device 103, and the resident electronic device 103 may determine positions of, and generate a map for, the accessory electronic devices 112C-D and the resident electronic device 104. The resident electronic devices 103-104 may then share their respective maps with one another in conjunction with sharing their connectivity graphs, such as in the manner described above with respect to FIG. 4. For example, the positioning information for each respective other electronic device may be included in the connectivity graph in association with the connectivity metric value(s) for each respective other electronic device.

The positions of the accessory electronic devices 104A-D may be measured by the resident electronic devices 103-104 in terms of distance and/or angle (e.g., orientation). The determined angle may be a relative angle, such as an angle determined with reference to the respective antenna directions of the respective resident electronic devices 103-104, and/or an absolute angle, such as an angle determined with reference to a particular direction, such as North.

In the instance that the measured angles are relative to antenna direction, the resident electronic devices 103-104 may utilize the measured angles between each other to properly translate the angles measured for the accessory electronic devices 112A-C. For example, the resident electronic device 103 may measure that the resident electronic device 104 is reachable at 80 degrees from its view. The resident electronic device 103 may receive positioning information from the resident electronic device 104 indicating that the resident electronic device 104 is positioned −100 degrees from the view of the resident electronic device 103. Accordingly, the resident electronic device 103 can combine this information to determine the position an orientation (e.g., antenna direction), of the resident electronic device 104, which can be used to properly translate, as needed, positioning measurements for the accessory electronic devices 112A-B that are received from the resident electronic device 104.

In one or more implementations, the resident electronic devices 103-104 may be out of direct signal range of one another, and therefore may be unable to determine the angle and/or position of the other resident electronic device. The resident electronic devices 103-104 may perform absolute angle measurements, such as angle measurements with reference to North instead of antenna direction. In this manner, each of the resident electronic devices 103-104 may individually translate angle measurements based on the orientation of their antenna relative to North, and all received angle measurements can be properly mapped with reference to North.

Thus, in FIG. 5, the resident electronic device 104 may measure an angle of 60 degrees for the accessory electronic device 112A, an angle of 45 degrees for the accessory electronic device 112B, and an angle of −100 degrees for the resident electronic device 103. The measured angles may be with reference to the antenna direction of the resident electronic device 104 and/or relative to North. Similarly, the resident electronic device 103 may measure an angle of −50 degrees for the accessory electronic device 112C, and an angle of −70 degrees for the accessory electronic device 112D, and an angle of 80 degrees for the resident electronic device 104. The resident electronic devices 103-104 may share their measured positioning information (e.g., angle/orientation and/or distance), such as in the manner described above with respect to the connectivity graphs. In this manner, each of the resident electronic devices 103-104 can map out the position of each of the accessory electronic devices 112A-D. The resident electronic devices 103-104 may also map the position of each other when in signal range.

The sharing of the positioning information of the accessory electronic devices 112A-D between the resident electronic devices 103-104 may allow for the resident electronic devices 103-104 to identify the accessory electronic devices 112A-D based on their position relative to one of the resident electronic devices 103-104. For example, the subject system may allow a user to provide commands like, e.g., "turn off the light near the speaker device," or "play music on the speaker device near the digital media player device," and the like. Similarly, the sharing of positioning information may allow for an electronic device to display the location of a particular accessory electronic device (and/or any device that is within signal range of one of the resident electronic devices 103-104), and/or to display a map that indicates the location of the resident electronic devices 103-104 and/or the accessory electronic devices 112A-D, even when the electronic device is remote from the LAN 108.

The sharing of positioning information may also facilitate making content recommendations, such as on a digital media player and/or a speaker device, based on which electronic devices (and associated user accounts) are near the digital media player and/or speaker device. In one or more implementations, the sharing of the positioning information may allow a user to create zones, automations, and/or home network scenes (e.g., a particular configuration of one or more accessory electronic devices 112A-D), by walking around the home network environment.

In one or more implementations, the location of the user (e.g., as indicated by an electronic device being carried or worn by the user) may be used to perform commands relative to the user's position in the home network environment. For example, the user may provide a command of "make lights follow me" or "I am going out," and lights may be turned on or off to follow the user as they leave the premises. For example, indoor lights may be turned off as the user walks out, and outdoor lights may be turned on. Similarly, a user may provide a command of "make the music follow me," and music playing on a speaker device near the current location of the user may be handed off to a different speaker device as the user moves throughout the home network environment. In one or more implementations, if the user is using a companion electronic device 109 to access an audio stream, the companion electronic device 109 itself (and thereby the audio stream) may be handed-off between different resident electronic devices 103-104 as the user moves throughout the home network environment.

As described above, one aspect of the present technology is the gathering and use of data available from specific and legitimate sources for responding to a user request within a home environment. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for responding to a user request within a home network environment. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of responding to a user request to control an accessory electronic device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 6:
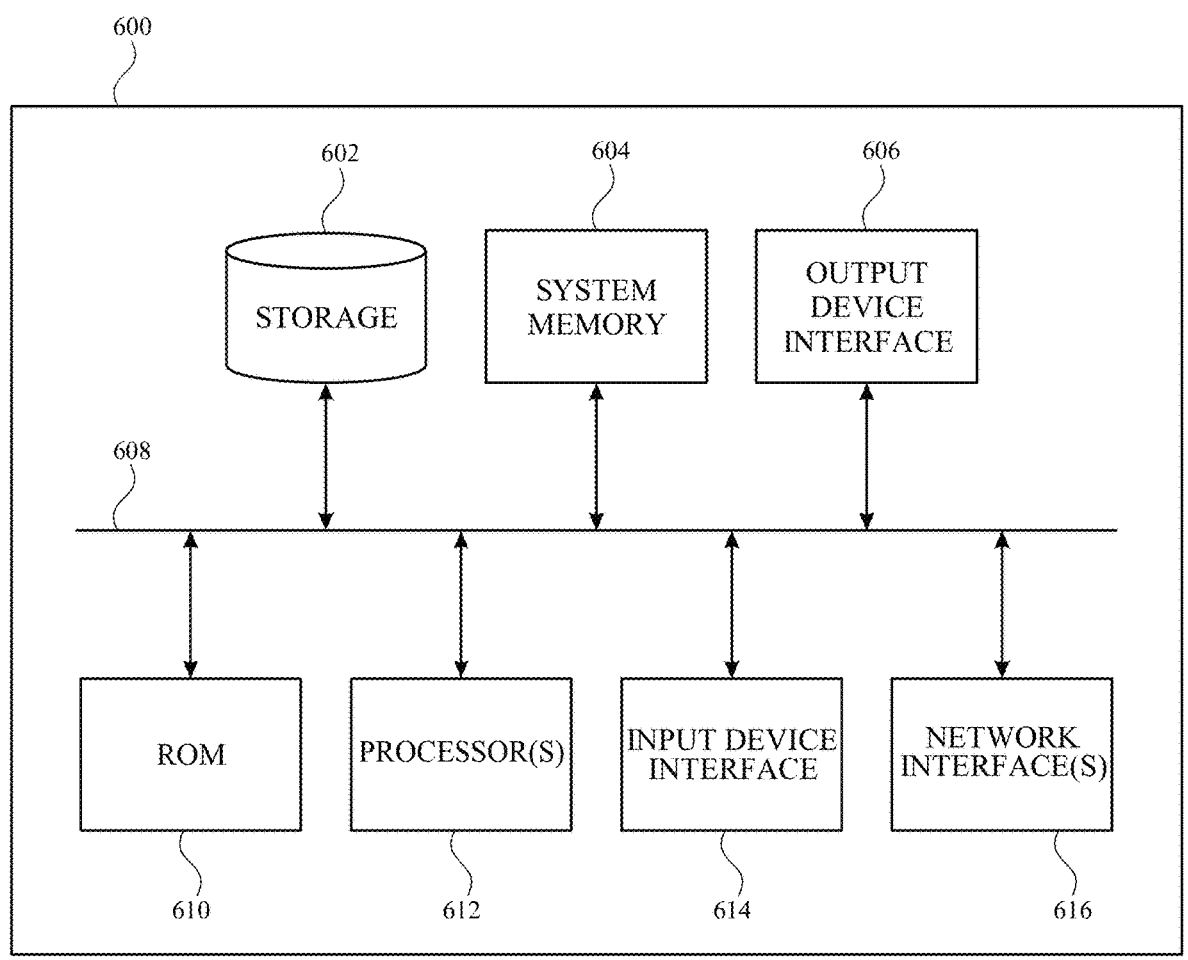
FIG. 6 illustrates an example electronic system with which aspects of the subject technology may be implemented in accordance with one or more implementations.

FIG. 6 illustrates an electronic system 600 with which one or more implementations of the subject technology may be implemented. The electronic system 600 can be, and/or can be a part of, one or more of the resident electronic devices 102-107, the accessory electronic devices 112A-D, and/or the server 114 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, by an electronic device of a local area network, a user request to provide an instruction to an accessory device;
   determining, by the electronic device, a connectivity metric value with respect to the accessory device;
   broadcasting, by the electronic device, a request for another connectivity metric value with respect to the accessory device, the request comprising an indication of the instruction to be provided to the accessory device;
   receiving, by the electronic device and responsive to the broadcasting, a response from another electronic device of the local area network, the response comprising the other connectivity metric value with respect to the accessory device;
   determining, by the electronic device, whether the electronic device or the other electronic device will provide the instruction to the accessory device based at least in part on the connectivity metric and the other connectivity metric;
   when the electronic device determines that the electronic device will provide the instruction to the accessory device, providing, by the electronic device, the instruction for transmission to the accessory device; and
   when the electronic device determines that the other electronic device will provide the instruction to the accessory device, foregoing, by the electronic device, the providing of the instruction for transmission to the accessory device.

2. The method of claim 1, wherein the electronic device and the other electronic device are registered with a same user account at a service provider.

3. The method of claim 1, wherein the connectivity metric is determined based at least in part on a link metric with respect to a link between the electronic device and the accessory device and one or more operational characteristics of the electronic device.

4. The method of claim 3, wherein the one or more operational characteristics of the electronic device comprise at least one of a processing resource availability of the electronic device and a communication resource availability of the electronic device.

5. The method of claim 1, wherein the connectivity metric value and the other connectivity metric value are the same, and determining, by the electronic device, whether the electronic device or the other electronic device will provide the instruction to the accessory device based at least in part on the connectivity metric and the other connectivity metric comprises:
   determining whether the electronic device or the other electronic device will provide the instruction to the accessory device based at least in part on a hash value determined by the electronic device and another hash value provided by the other electronic device in conjunction with the connectivity metric value.

6. The method of claim 1, wherein the accessory device is configured to communicate exclusively via peer-to-peer communications.

7. The method of claim 1, further comprising:
   when the electronic device determines that the electronic device will provide the instruction to the accessory device, receiving, responsive to providing the instruction for transmission to the electronic device, a response from the accessory device, the response indicating a status of the accessory device with respect to the instruction.

8. The method of claim 7, further comprising:
   when the electronic device determines that the other electronic device will provide the instruction to the accessory device, receiving, from the other electronic device, the status of the accessory device with respect to the instruction.

9. The method of claim 1, further comprising:
   receiving, by the electronic device and responsive to the broadcasting, another response from an additional electronic device of the local area network, the other response comprising an additional connectivity metric value with respect to the accessory device; and determining, by the electronic device, whether the electronic device, the other electronic device, or the additional electronic device will provide the instruction to the accessory device based at least in part on the connectivity metric and the other connectivity metric; and when the electronic device determines that the additional electronic device will provide the instruction to the accessory device, foregoing, by the electronic device, the providing of the instruction to the accessory device.

10. An electronic device comprising:
a memory; and
at least one processor configured to:
scan for one or more proximate accessory devices;
generate a connectivity graph based at least in part on the scan, the connectivity graph comprising a connectivity metric value for at least one proximate accessory device discovered via the scan;
broadcast the connectivity graph;
receive another connectivity graph broadcasted by another electronic device, the other connectivity graph comprising another connectivity metric value for the at least one proximate accessory device;
receive a request to provide an instruction to the at least one proximate accessory device;
determine whether the electronic device or the other electronic device will provide the instruction for transmission to the at least one proximate accessory device based at least in part on the connectivity metric value of the connectivity graph and the other connectivity metric value of the other connectivity graph;
when the electronic device is determined to provide the instruction, provide the instruction for transmission to the accessory device; and
when the other electronic device is determined to provide the instruction to the accessory device, provide, for transmission to the other electronic device, the instruction to be provided to the accessory device.

11. The electronic device of claim 10, wherein the electronic device and the other electronic device are associated with a local area network.

12. The electronic device of claim 11, wherein the request is received from an additional electronic device that is external to the local area network.

13. The electronic device of claim 12, wherein the electronic device, the other electronic device and the additional electronic device are registered with a same user account at a service provider.

14. The electronic device of claim 10, wherein the accessory device comprises a connected home device and the instruction comprises an instruction to activate at least a portion of the connected home device.

15. The electronic device of claim 10, wherein the at least one processor is configured to perform the scan, the generate, and the broadcast periodically.

16. The electronic device of claim 10, wherein the connectivity graph further comprises positioning information for the at least one proximate accessory device.

17. The electronic device of claim 10, wherein the at least one processor is further configured to:
receive a second connectivity graph broadcasted by the other electronic device, the second connectivity graph comprising a second connectivity metric value for the at least one proximate accessory device; and
replace the other connectivity graph with the second connectivity graph.

18. A non-transitory machine readable-medium storing instructions that, when executed by one or more processors, cause the one or more processors to perform operations comprising:
receiving, by an electronic device of a local area network comprising a plurality of electronic devices, a request to provide an instruction to an accessory device, wherein the plurality of electronic devices includes the electronic device;
selecting, by the electronic device and based at least in part on a connectivity graph for the local area network, one of the plurality of electronic devices to provide the instruction for transmission to the accessory device, the connectivity graph comprising connectivity metric values with respect to the accessory device and the plurality of electronic devices of the local area network;
when the selected one of the plurality of electronic devices comprises the electronic device, providing, by the electronic device, the instruction for transmission to the accessory device; and
when the selected one of the plurality of electronic devices comprises another electronic device, providing, by the electronic device, the instruction for transmission to the other electronic device.

19. The non-transitory machine readable-medium of claim 18, wherein the operations further comprise:
periodically determining and broadcasting, by the electronic device, a connectivity metric value with respect to a link between the electronic device and the accessory device; and
periodically receiving, by the electronic device and from the other electronic device, another connectivity metric value with respect to another link between the other electronic device and the accessory device; and
maintaining the connectivity graph based at least in part on the periodically determined connectivity metric value and the periodically received other connectivity metric value.

20. The non-transitory machine readable-medium of claim 18, wherein the operations further comprise:
when the selected one of the plurality of electronic devices comprises the electronic device, receiving, from the accessory device and responsive to the instruction, a status of the accessory device with respect to the instruction; and
when the selected one of the plurality of electronic devices comprises the other electronic device, receiving, from the other electronic device, the status of the accessory device with respect to the instruction.

* * * * *